United States Patent [19]

Bartkowiak et al.

[11] Patent Number: 5,771,362
[45] Date of Patent: Jun. 23, 1998

[54] PROCESSOR HAVING A BUS INTERCONNECT WHICH IS DYNAMICALLY RECONFIGURABLE IN RESPONSE TO AN INSTRUCTION FIELD

[75] Inventors: John G. Bartkowiak; Thomas W. Lynch, both of Austin, Tex.

[73] Assignee: Advanced Micro Devices, Inc., Sunnyvale, Calif.

[21] Appl. No.: 649,810

[22] Filed: May 17, 1996

[51] Int. Cl.$^6$ .................................................. G06F 13/00
[52] U.S. Cl. .......................................... 395/312; 395/306
[58] Field of Search .................................. 395/312, 311, 395/309, 310, 306, 562, 384, 566

[56] References Cited

FOREIGN PATENT DOCUMENTS 0 479 390 A2   10/1991   European Pat. Off. .......... G06F 9/38
96/08777 A      3/1996   WIPO .............................. G06F 15/80

OTHER PUBLICATIONS

Corporaal, H. et al., "Move: A Framework for High–Performance Processor Design," Institute of Electrical and Electronics Engineers, Proceedings of the Supercomputing Conference, Albuquerque, Nov. 18–22, 1991, XP000337525, pp. 692–701.

International Search Report for PCT/US 97/01044.

*Primary Examiner*—Glenn A. Auve
*Attorney, Agent, or Firm*—Conley, Rose & Tayon; B. Noel Kivlin

[57] ABSTRACT

A processor employing a dynamically configurable bus interconnect is provided. The interconnect routes data between functional units and memories included within the processor in response to an instruction field. As opposed to a particular hard-wired interconnect, the dynamically variable interconnect may be modified to form an optimum interconnect for the particular algorithm being executed. Still further, the interconnect may be modified between several configurations during the execution of the algorithm, as often as each clock cycle. Because an instruction field is used to directly specify the configuration of the interconnect during execution of that instruction, control over the interconnect is afforded to the programmer writing the code which implements a particular algorithm.

18 Claims, 8 Drawing Sheets

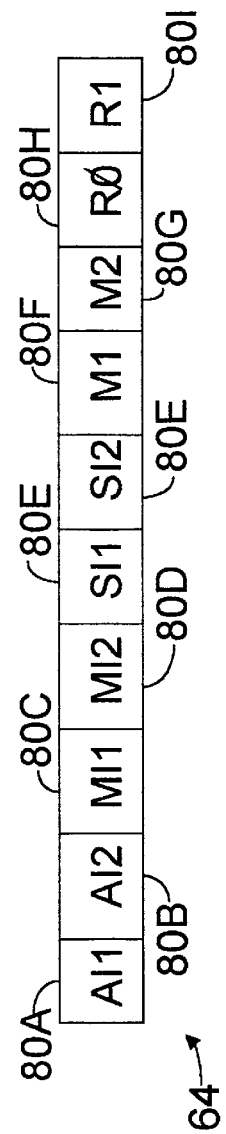

| Identifier | Corresponding Bus |
|---|---|
| AI1 | Input Bus 36A |
| AI2 | Input Bus 36B |
| MI1 | Input Bus 36C |
| MI2 | Input Bus 36D |
| SI1 | Input Bus 36E |
| SI2 | Input Bus 36F |
| M1 | Data Memory Bus 26A |
| M2 | Data Memory Bus 26B |
| R0 | Register Port Bus 40A |
| R1 | Register Port Bus 40B |
| A0 | Output Bus 38A |
| M0 | Output Bus 38B |
| S0 | Output Bus 38C |

| Input | Encoding | Encoding 2 |
|---|---|---|
| AI1 | 100 (First Data Memory) | 000 (None) |
| AI2 | 101 (Second Data Memory) | 000 (None) |
| MI1 | 001 (ALU Output) | 000 (None) |
| MI2 | 001 (ALU Output) | 000 (None) |
| SI1 | 010 (MAC Output) | 000 (None) |
| SI2 | 000 (None) | 000 (None) |
| M1 | 000 (None) | 0011 Special Func. Unit |
| M2 | 000 (None) | 000 |

| Input | Encoding 1 | Encoding 2 | Encoding 3 |
|---|---|---|---|
| AI1 | 000 | 101 | 000 |
| AI2 | 000 | 010 | 000 |
| MI1 | 100 | 000 | 000 |
| MI2 | 101 | 000 | 001 |
| SI1 | 000 | 000 | 000 |
| SI2 | 000 | 000 | 000 |
| M1 | 000 | 000 | 000 |
| M2 | 000 | 000 | 000 |

PROCESSOR HAVING A BUS INTERCONNECT WHICH IS DYNAMICALLY RECONFIGURABLE IN RESPONSE TO AN INSTRUCTION FIELD

BACKGROUND OF THE INVENTION

1. Field of the Invention

This invention is related to the field of processors and, more particularly to routing of operands within processors.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

A digital signal processor is essentially a microprocessor which includes special hardware for executing complex mathematical functions at speeds and efficiencies not usually associated with microprocessors. Digital signal processors include execution units which comprise one or more arithmetic/logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. An exemplary DSP is the ADSP 2171 available from Analog Devices, Inc. of Norwood, Mass.

Typically, operands for instruction operations are transferred from data memories within the DSP to the appropriate functional unit. An input register within the functional unit captures the values provided such that the corresponding functional unit may operate upon the operands in the succeeding clock cycle. The value generated is stored into an output register. During a clock cycle subsequent to performance of the instruction operation, the result is driven from the output register upon a result bus. Often, the result bus is shared between the functional units, such that at most one functional unit may drive a result during a particular clock cycle. Unfortunately, the limitation of one result per clock cycle causes decreased performance when the pipelined operation of instructions leads to results in more than one functional unit concurrently being ready for transfer upon the result bus. One of the functional units must stall, awaiting a free cycle upon the result bus to transfer its result. Typically, the result which is produced first according to the sequential order of instructions is conveyed first, and a subsequent operation is stalled. The decreased performance occurs despite the otherwise independent nature of the operations. Since DSPs often operate upon real-time data, performance decreases are often more critical in DSPs than microprocessors. If a particular performance level (e.g. average number of instruction operations per cycle) cannot be achieved in a given application, the DSP may not be suitable for that application.

SUMMARY OF THE INVENTION

The problems outlined above are in large part solved by a processor in accordance with the present invention. The processor employs a dynamically configurable bus interconnect. The interconnect routes data between functional units and memories included within the processor in response to an instruction field. As opposed to a particular hard-wired interconnect, the dynamically variable interconnect may be modified to form an optimum interconnect for the particular algorithm being executed. Still further, the interconnect may be modified between several configurations during the execution of the algorithm, as often as each clock cycle. The flexibility of the interconnect may allow optimum transfer of operands for even complex algorithms.

Because an instruction field is used to directly specify the configuration of the interconnect during execution of that instruction, control over the interconnect is afforded to the programmer writing the code which implements a particular algorithm. Advantageously, the optimum configuration may be selected by the programmer according to the requirements of the algorithm. Since the programmer is aware of the algorithm being encoded, the programmer may determine the optimal configuration instead of the processor employing hardware in an attempt to determine the optimal configuration. Therefore, the hardware used to implement the processor may be advantageously reduced, thereby reducing die size and hence fabrication costs.

Broadly speaking, the present invention contemplates a processor comprising an instruction sequencer and a bus interconnect. The instruction sequencer is configured to execute instructions having an opcode field and a bus configuration field. Additionally, the instruction sequencer is configured to produce at least one control signal in response to a first encoding of the bus configuration field. The bus interconnect, coupled to receive the control signal from the instruction sequencer, includes a first plurality of buses and a second plurality of buses. The bus interconnect is configured to route data from one of the first plurality of buses upon one of the second plurality of buses if the control signal is asserted.

The present invention further contemplates a method for efficient data routing in a processor comprising several steps. A connection between a first output of a first functional unit and a first input of a second functional unit is encoded within a first field of an instruction. The first field is detected upon execution of the instruction. Upon detection of the first field, at least one control signal is asserted. Data from the first output is routed to the first input in a bus interconnect upon assertion of the at least one control signal.

BRIEF DESCRIPTION OF THE DRAWINGS

Other objects and advantages of the invention will become apparent upon reading the following detailed description and upon reference to the accompanying drawings in which:

FIG. 5A is a diagram depicting one embodiment of a bus configuration field shown in FIG. 4.

FIG. 5B is a diagram depicting another embodiment of the bus configuration field shown in FIG. 4.

FIG. 5C is a table listing identifiers shown in FIGS. 5A and 5B and their relationship to signals shown in FIG. 1.

FIG. 8 is a table showing exemplary encodings of the bus configuration field shown in FIG. 5B when executing the algorithm shown in FIG. 6.

FIG. 9 is a table showing exemplary encodings of the bus configuration field shown in FIG. 5B when executing a polynomial evaluation.

Figure 1:
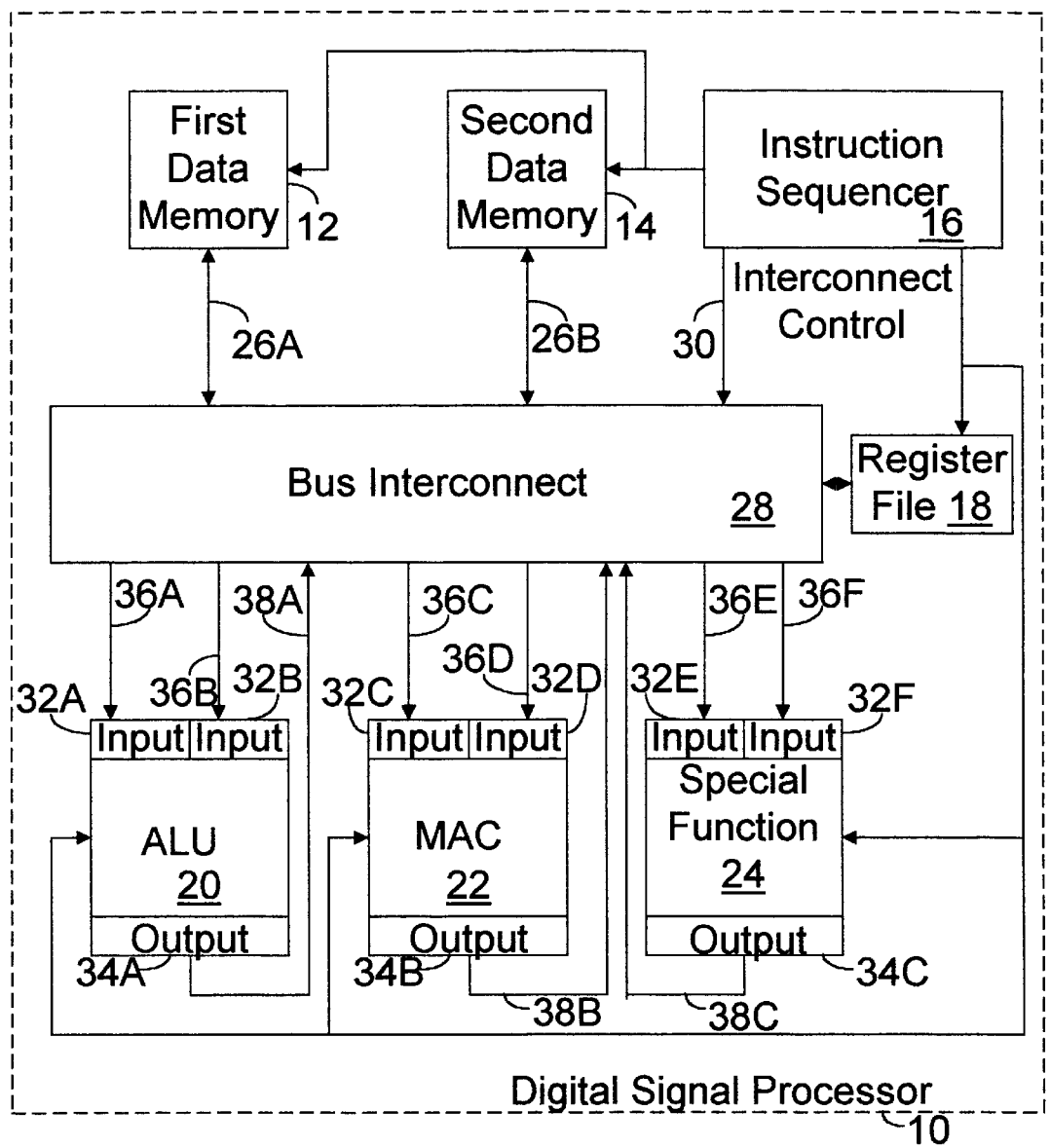
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a digital signal processor 10 in accordance with the present invention is shown. DSP 10 includes a first data memory 12, a second data memory 14, an instruction sequencer 16, a register file 18, an arithmetic/logic unit (ALU) 20, a multiply and accumulate (MAC) unit 22, a special functional unit 24, and a bus interconnect 28. ALU 20, MAC unit 22, and special functional unit 24 are examples of functional units. Additional functional units may be included within DSP 10 as well. As used herein, a "functional unit" is a block of circuitry configured to perform at least one instruction operation. A functional unit may be configured to perform more than one instruction operation. As used herein, an instruction operation is an operation (e.g. arithmetic, logical, and data movement operations) specified by the instructions within the instruction set of the DSP. The operation specifies a specific manipulation to be performed upon one or more input operands, producing a result. The DSP includes functionality within at least one of its functional units for performing each instruction operation specified within the instruction set. A particular instruction may specify one or more instruction operations.

As shown in FIG. 1, instruction sequencer 16 is coupled to first data memory 12, second data memory 14, register file 18, ALU 20, MAC unit 22, and special functional unit 24. First data memory 12 and second data memory 14 are coupled to a pair of data memory buses 26A and 26B, respectively. Bus interconnect 28 is coupled to data memory buses 26A and 26B. Additionally, bus interconnect 28 is coupled to register file 18, ALU 20, MAC unit 22, and special functional unit 24.

Generally speaking, bus interconnect 28 is configured to route values between the functional units of DSP 10, first and second data memories 12 and 14, and register file 18. Bus interconnect 28 is configurable to transfer data between a particular source and one or more destinations according to the execution of an instruction within instruction sequencer 16. During another clock cycle, data may be transferred between the particular source and one or more destinations different from the previous destinations. Advantageously, bus interconnect 28 provides a mechanism for transferring more than one result from the functional units to other functional units or destinations within register file 18 or first and/or second data memories 12 and 14. The increased data throughput may enhance the performance characteristics of DSP 10.

Bus interconnect 28 receives control signals upon an interconnect control bus 30 from instruction sequencer 16. Instruction sequencer 16 asserts a particular control signal to cause transfer of data between a particular source and a particular destination. Deasserting the particular control signal inhibits transfer of data between the particular source and the particular destination. While the particular control signal is deasserted, a second control signal may be asserted to cause transfer of data from another source to the particular destination. The control signals upon interconnect control bus 30 are generated in response to a field of the instructions being executed by instruction sequencer 16. The field specifies the control signals either in encoded or decoded format. Advantageously, bus interconnect 28 may be specified by the instructions being executed to be an optimal interconnection of the functional units of DSP 10 for the particular algorithm being performed.

First data memory 12 and second data memory 14 each comprises a plurality of storage locations for storing data. Control signals from instruction sequencer 16 include an address for uniquely identifying one of the storage locations to be accessed in a given clock cycle. Additionally, control signals identify the direction of transfer of data. A read transfer may be specified, in which data from the storage location is conveyed upon data memory buses 26. Alternatively, a write transfer may be specified. Write transfers involve storing data conveyed upon data memory buses 26 into the selected storage location. Still further, no transfer may be specified via control signals from instruction sequencer 16 if data memory is not accessed during a clock cycle. First data memory 12 employs data memory bus 26A for transfers to and from bus interconnect 28, while second data memory 14 employs data memory bus 26B for transfers to and from bus interconnect 28. It is noted that first data memory 12 and second data memory 14 may comprise RAM, ROM, or any other type of memory storage.

Register file 18 includes a plurality of register storage locations for storing data. The register storage locations may store operands, or may store results generated by the functional units. Although any number of storage locations may be included within register file 18, sixteen register storage locations may be included according to one embodiment. Each register storage location is identified by a number, referred to as a register address. Instructions detected by instruction sequencer 16 may specify register addresses for operands and for the result of the instruction. As used herein, the term "operand" refers to a value operated upon in response to an instruction. The value is typically used as an input to the operation. A "destination operand" or "destination" identifies a location for storing the result of the operation. It is noted that register file 18 is an optional component used to enhance the embodiment of DSP 10 shown in FIG. 1. Other embodiments of DSP 10 may not include register file 18.

Each of the functional units receives operands from bus interconnect 28. Control signals asserted by instruction sequencer 16 to the functional units identify the instruction operation to be performed upon the received operands. The result produced is then conveyed back to register file 18 or first and/or second data memories 12 and 14 for storage. Preferably, each functional unit is configured to compute a result in a single clock cycle. However, other embodiments of DSP 10 are contemplated in which the functional units may be pipelined such that multiple clock cycles elapse during the performance of a particular instruction operation.

ALU 20 is configured to provide arithmetic and logical instruction operations. Arithmetic instruction operations may include addition and subtraction, among others. Logical instruction operations may include logical AND and logical OR, among others. Control signals from instruction sequencer 16 identify the specific arithmetic or logical function to be performed by ALU 20. ALU 20 includes a pair of input registers 32A and 32B for storing input operands provided by bus interconnect 28, and an output register 34A for conveying results to bus interconnect 28. Input registers 32A and 32B are coupled to input buses 36A and 36B. Similarly, output register 34A is coupled to an output bus 38A.

MAC unit 22 is configured to perform a multiply and accumulate function. Multiply and accumulate is a commonly employed instruction operation in signal processing applications, and hence a dedicated functional unit is often provided for performance of this function. Input operands are multiplied, producing a product. In one embodiment, a pair of input operands within input registers 32C and 32D are provided for multiplication. The product is added to an accumulator register included within MAC unit 22. Output register 34B may serve as the accumulator register. MAC unit 22 may further be configured to produce, upon assertion of appropriate control signals from instruction sequencer 16, the product of the input operands instead of the accumulated sum of multiple products. In this manner, MAC unit 22 may be used to perform a multiplication. MAC unit 22 includes input registers 32C and 32D coupled to input buses 36C and 36D and output register 34B coupled to output bus 38B.

Special functional unit 24 is included for performing a specific predetermined function upon assertion of appropriate control signals from instruction sequencer 16. The specific function may be a specialized arithmetic/logical operation which is often performed in the signal processing applications for which DSP 10 is optimized. For example, special functional unit 24 may be configured to compare one operand to another operand. The operand which is numerically smaller may be returned as the result. The result may be routed to one of the input registers 32E or 32F, such that multiple comparisons of operands result in the numerically smallest value of the operands being identified. Generally speaking, special functional unit 24 may be configured to perform any specific function in accordance with the applications for which DSP 10 is optimized. Other exemplary special functions may include: (i) a lookup table or content-addressable memory (CAM) which stores predetermined values for comparison to values generated by DSP 10 or for other utilization by DSP 10; (ii) an integer to floating point converter for converting integer values generated by DSP 10 into floating point values for cases in which the application for which DSP 10 is designed uses floating point values; or (iii) a particular logarithm function which is utilized in the algorithms for which DSP 10 is optimized. These examples are but a few of the myriad special functions which may be employed by DSP 10 within the spirit and scope of the present invention. As shown in FIG. 1, special function unit 24 includes input registers 32E and 32F coupled to input buses 36E and 36F and output register 34C coupled to output bus 38C.

Register file 18 receives control signals from instruction sequencer 16 as well. The control signals include a register address for each register storage location accessed during the current clock cycle. Register file 18 may be configured with one or more ports for read or write access to the storage locations therein. For each port, control signals may be included for conveying a register address and a transfer direction (i.e. read or write). As used herein, a control signal is a value comprising one or more bits conveyed upon conductors coupled between two or more blocks of circuitry.

Instruction sequencer 16 is configured to retrieve instructions from an instruction memory included therein and to assert control signals in response to the instructions to other portions of DSP 10. The instruction memory may be configured as any type of memory, including a RAM or ROM memory storage. Instruction sequencer 16 may additionally be configured to perform dependency checking between successive instructions to ensure that a value generated by one instruction and operated upon by a second instruction subsequent to that instruction is properly delivered to the second instruction. Still further, instruction sequencer 16 may include address generation circuitry for generating addresses for first and second data memories 12 and 14. The addresses are generated in accordance with the dictates of the instructions being executed. It is noted that instructions may specify instruction operations which are pipelined through two or more functional units. In such cases, instruction sequencer 16 includes circuitry for generating control signals in response to a particular instruction during several consecutive clock cycles.

According to one embodiment, exemplary instructions for DSP 10 may specify one or more of the following instruction operations: (i) data movement between a register storage location and first data memory 12 or second data memory 14; (ii) an arithmetic/logical operation; (iii) a multiply and accumulate operation, the product to be accumulated by output register 34B; (iv) a multiply operation, the product to be conveyed to bus interconnect 28; and (v) a special function performed by special functional unit 24. Additional instruction operations may be included as well. Often, an instruction will use an address for first data memory 12 and second data memory 14 which was generated by a previous instruction. Additionally, the instruction may modify the addresses stored in instruction sequencer 16 to generate new addresses for use by subsequent instructions.

Figure 2:
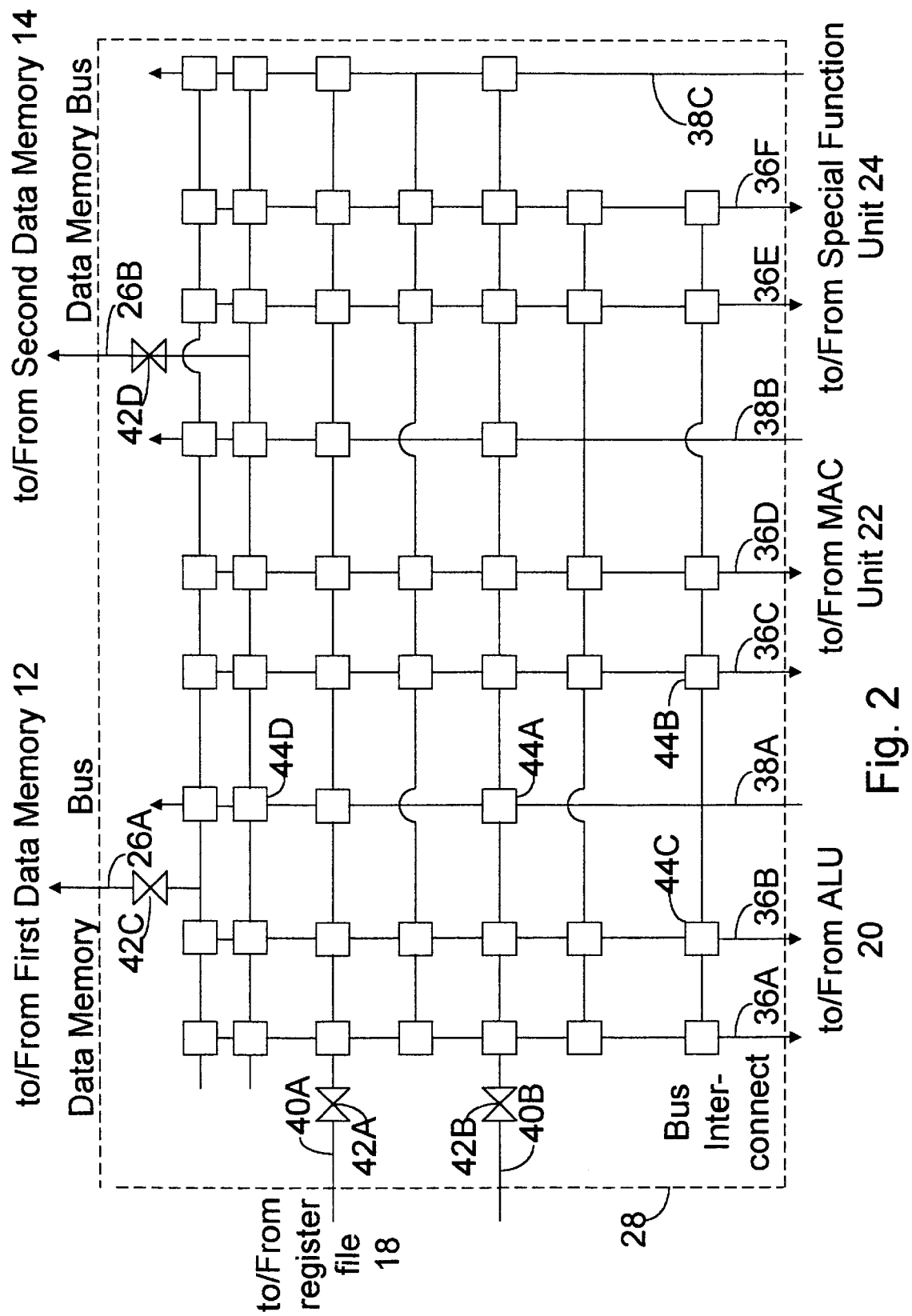
FIG. 2 is a block diagram of one embodiment of the bus interconnect shown in FIG. 1.

Turning next to FIG. 2, a block diagram of one embodiment of bus interconnect 28 is shown. Input buses 36 and output buses 38 from the functional units are shown, as well as data memory buses 26 from first and second data memories 12 and 14. Additionally, buses for two register ports upon register file 18 are shown, labeled as first port bus 40A and second port bus 40B. Data memory buses 26 may be used for conveying values from first and second data memories 12 and 14 as well as for conveying values to first and second data memories 12 and 14. Similarly, first and second port buses 40 may be used for conveying values from register file 18 as well as for conveying values to register file 18. Bi-directional driver circuits 42A–42D receive the transfer direction for each of the respective buses in order to determine the which direction to drive data. If a read transfer is being performed, then the value conveyed upon the respective bus is driven into bus interconnect 28. If a write transfer is being performed, values provided by bus interconnect 28 are driven to register file 18 or first and second data memories 12 and 14.

Generally speaking, bus interconnect 28 provides configurable connections between the buses connected thereto. Each possible connection is provided with a control signal. When that control signal is asserted, the connection between the two buses is made. When that control signal is deasserted, the connection between the two buses is inhibited. In the embodiment shown in FIG. 2, bus interconnect 28 is a crossbar interconnect. A crossbar interconnect comprises a plurality of switches (e.g. switches 44A, 44B, 44C, and 44D), one for each pair of buses which may be connected. Each switch receives a control signal from instruction sequencer 16 (not shown in FIG. 2 for clarity). It is noted that the buses shown in FIG. 2 extend through each of the switches to which they connect, such that connectivity to another switch may be made within operation of the other switches. For example, if switch 44D is controlled to provide connection between second data memory bus 26B and ALU output bus 38A, the connection is made without interference or operation by switch 44A (which is configured between switch 44D and ALU 20 upon ALU output bus 38A).

Several exemplary switches are given reference numbers to allow discussion of connectivity between buses within bus interconnect 28. Switch 44A couples output bus 38A and second register port bus 40B (through bi-directional driver 42B). This path may be used to store results from ALU 20 into register file 18. Switch 44B couples output bus 38A to input bus 36C. This path may be used to route a result from ALU 20 to MAC unit 22. Similarly, a result may be routed from the output of ALU 20 to the input of ALU 20 using switch 44C. Finally, a result from ALU 20 may be routed upon second data memory bus 26B via switch 44D. As shown in FIG. 2, bus interconnect 28 allows complete connectivity between the buses connected thereto. In other words, every output bus is connected to sufficient switches to allow connection to every input bus. Other embodiments of bus interconnect 28 may allow limited interconnection between the input and output buses connected thereto.

Figure 3A:
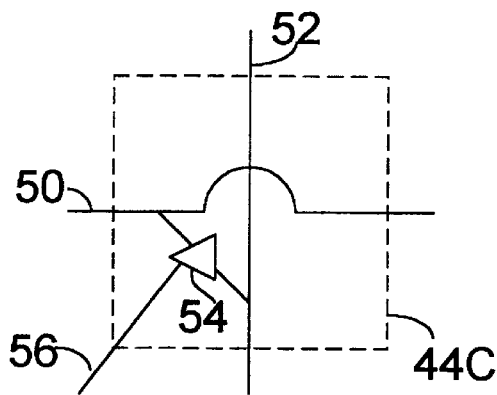
FIG. 3A is a diagram of one embodiment of a switch shown in FIG. 2.
Figure 3B:
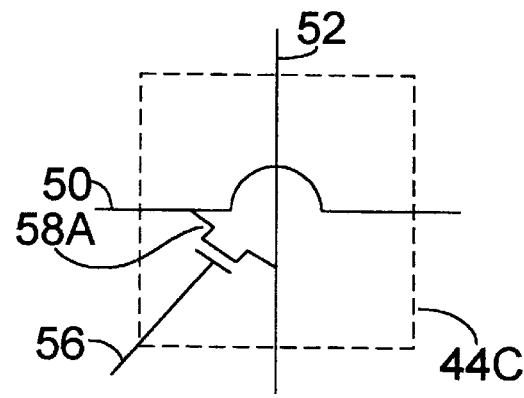
FIG. 3B is a diagram of a second embodiment of the switch shown in FIG. 2.
Figure 3C:
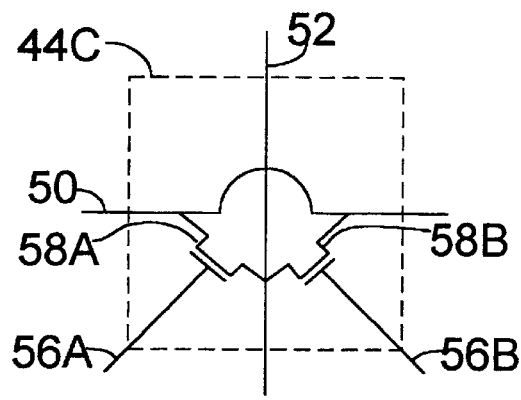
FIG. 3C is a diagram of a third embodiment of the switch shown in FIG. 2.

Turning now to FIGS. 3A, 3B, and 3C, several embodiments of a switch suitable for use within switch 44C and other switches 44 are shown. The switches shown in FIGS. 3A, 3B, and 3C are one bit switches. Multiple such switches may be configured in parallel to form a switch 44.

FIG. 3A depicts a switch having an input line 50, an output line 52, a tri-stating buffer 54, and a control line 56. As noted above, input line 50 and output line 52 extend through switch 44C, such that switch 44C need not perform any action to allow connectivity of input line 50 or output line 52 to other switches 44. Additionally, input line 50 and output line 52 do not intersect within switch 44C. Therefore, input line 50 and output line 52 are electrically isolated from one another unless tri-stating buffer 54 connects the two lines. When the signal upon control line 56 is asserted, tri-stating buffer 54 activates and drives the value conveyed upon input line 50 onto output line 52. When the signal upon control line 56 is deasserted, tri-stating buffer 54 is deactivated and inhibits the value conveyed upon input line 50 from being conveyed upon output line 52.

FIG. 3B depicts a second embodiment of switch 44C including input line 50, output line 52, and control line 56. In this embodiment, an NMOS transistor 58A performs the switching function. FIG. 3C is an embodiment of switch 44C including the elements of FIG. 3B as well as a PMOS transistor 58B. Instead of a single control line 56, switch 44C as shown in FIG. 3C includes a pair of control lines 56A and 56B. The control lines 56A and 56B typically carry control signals which are the logical inverse of each other. In this manner, NMOS transistor 56A and PMOS transistor 56B operate together to perform the switching function of switch 44C.

Figure 4:
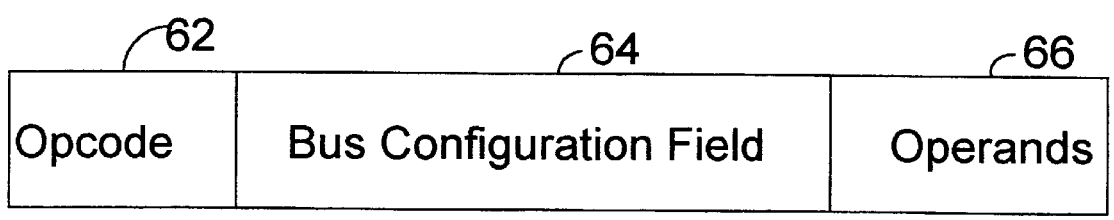
FIG. 4 is a diagram depicting instruction fields according to one embodiment of the present invention.

Turning now to FIG. 4, an exemplary instruction format 60 is shown. Instruction 60 includes an opcode field 62, an bus configuration field 64, and an operands field 66. Opcode field 62 includes the portion of instruction 60 containing the opcode (i.e. the portion of the instruction which uniquely identifies the instruction from the other instructions within the instruction set employed by DSP 10). Bus configuration field 64 includes bits which define the configuration of bus interconnect 28 during the execution of the instruction. Instruction sequencer 16 asserts control signals upon interconnect control bus 30 in response to the encoding of bus configuration field 64. Finally, operands field 66 is used to specify additional operands for instruction 60. Bus configuration field 64 supplies most of the operands for the instruction by directing data to the inputs of the functional units. However, if operands are retrieved from register file 18 or results are stored into register file 18, operands field 66 specifies the register address. Similarly, if an operand is conveyed by first or second data memory 12 or 14 or if a result is stored therein, memory address information is included in operands field 66 for generating a memory address. According to certain embodiments, the memory address information may specify modification of an address stored in address generation hardware within instruction sequencer 16. For example, an increment of decrement of the address may be specified. Typically, the address is modified to produce an address for use by a subsequent instruction. Alternatively, the memory address information may specify a particular address. For example, an address may be specified via addition of a displacement and zero or more register operands.

In one embodiment, the control signal upon control line 56 as shown in FIGS. 3A and 3B is one of the control signals provided by instruction sequencer 16 upon interconnect control bus 30. Therefore, switch 44C connects or inhibits connection of input line 50 and output line 52 in response to an instruction field within an instruction executed by instruction sequencer 16. Similarly, control signals upon control lines 56A and 56B shown in FIG. 3C are control signals from interconnect control bus 30, according to one embodiment.

FIG. 5A depicts one embodiment of bus configuration field 64. As shown in FIG. 5A, bus configuration field 64 comprises a subfield for each output bus 38. For example, subfield 70A includes bits defining the buses to which ALU output bus 38A is connected during the clock cycle. Since ALU output bus 38A may be connected to multiple input buses simultaneously, subfield 70A uses an encoding in which each bit defines connectivity to a particular input bus. For example, bit 72A defines the connectivity between ALU output bus 38A and MAC unit input bus 36C. If bit 72A is set, ALU output bus 38A is connected to MAC unit input bus 36C. If bit 72A is clear, ALU output bus 38A is not connected to MAC unit input bus 36C. Similarly, bit 72B defines connectivity between ALU output bus 38A and MAC unit input bus 36D. In the present embodiment, bits are included in each subfield 70 for first and second data memory buses 26, ALU input buses 36A and 36B, MAC unit input buses 36C and 36D, special function unit 36E and 36F, and the first and second register ports 40A and 40B.

Similarly, subfield 70B defines connectivity between second data memory bus 26B and various input buses. It is noted that, for the bi-directional buses within bus interconnect 28 (such as second data memory bus 26B), the corresponding subfield 70 specifies connections for read transfers. If the transfer is a write, then the corresponding subfield 70 should be coded to zero.

The embodiment of bus configuration field 64 shown in FIG. 5A enjoys the advantage that each bit in subfields 70 may directly correspond to a control signal upon interconnect control bus 30, such as control signal 56 shown in FIGS. 3A and 3B. For an embodiment of switches 44C using the circuit of FIG. 3C, control signal 56A may directly correspond to a bit within subfields 70 and control signal 56B may be the logical inversion of the bit. For example, switch 44B shown in FIG. 2 may receive a control signal in response to bit 72A of subfield 70A.

Turning now to FIG. 5B, a second embodiment of bus configuration field 64 is shown. In this embodiment, bus configuration field 64 comprises a plurality of subfields 80. Each subfield 80A–80I corresponds to an input bus 36 or a bi-directional bus such as data memory buses 26. For the bi-directional buses, the corresponding subfield 80 specifies a connection for a write transfer. Read transfers are specified via the subfield 80 corresponding to the input bus or buses 36 upon which the transfers occur. As opposed to the subfields 70 shown in FIG. 5A, in which multiple connections are defined by each subfield such as subfields 70A and 70B, each subfield 80 encodes one connection. Since subfields 80A–80I specify the connection for an input bus 36 or a write transfer upon a bi-directional bus, one connection may be specified. If more than one connection were specified, then contention would result upon the corresponding input bus 36. Because one connection per subfield 80A–80I is specified, subfields 80 may hold encoded values.

One embodiment of the encodings used for subfields 80 are shown as tables 82 and 84 Table 82 depicts the encodings for the bi-directional buses, such as data memory buses 26 and register port buses 40. Table 84 depicts encodings for input buses 36. It is noted that any encoding may be suitable.

Turning now to FIG. 5C, a table 86 listing the identifiers employed upon FIGS. 5A and 5B is shown. Table 86 associates each identifier with a particular bus shown in FIG. 1.

Figure 6:
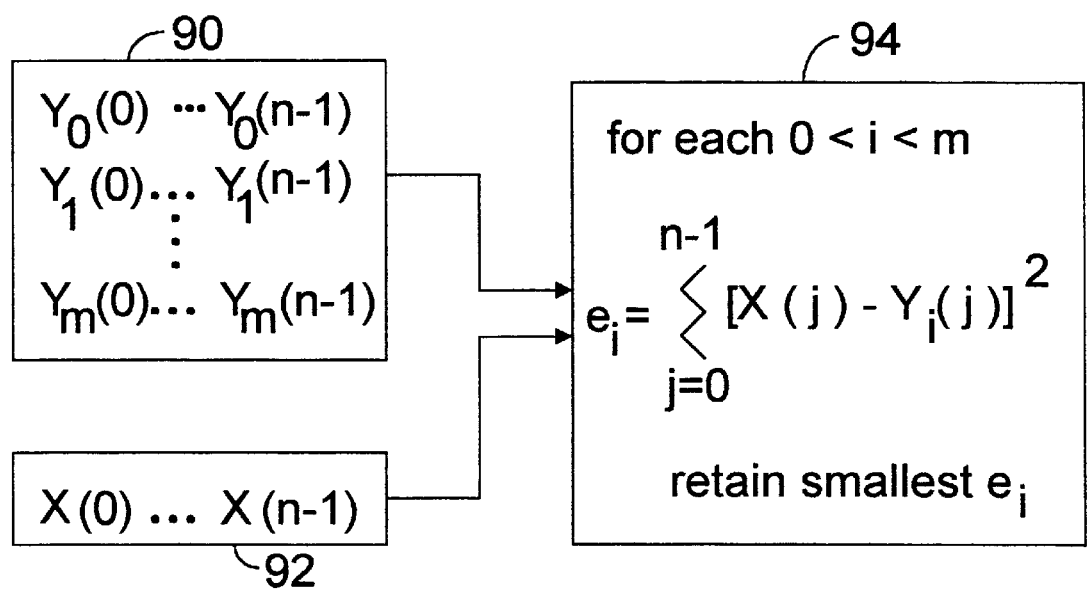
FIG. 6 is a diagram depicting an algorithm which may be executed by the processor shown in FIG. 1.

Turning next to FIG. 6, an exemplary algorithm (or DSP operation) which may be performed by DSP 10 is shown. The algorithm is common in speech compression applications, for example. An input vector X(0) through X(n−1), shown in box 92, is examined. The input vector may represent a segment of filtered speech uttered by a user of the computer system into which DSP 10 is configured, for example. The speech segment may first be filtered through a linear predictive coding filter, producing a residual (the input vector). The input vector is compared to a set of known vectors $Y_0$ through $Y_m$, shown in box 90. Each known vector includes the same number of elements as the input vector. The known vectors are constant, representing known residuals, for example. The comparison is performed by subtracting each element of a particular known vector from the corresponding element of the input vector, and squaring the obtained difference. The squared differences corresponding to a particular known vector are summed. The smallest of the sums computed for each of the known vectors is saved. The sum may represent the difference between the known vector and the input vector, with larger numerical values indicating a larger difference between the input vector and the known vector. Therefore, the known vector associated with the numerically smallest sum may be selected as the most likely match to the input vector. The index (e.g. 0 through m) may be conveyed to a receiving device having the same set of known vectors $Y_0$ through $Y_m$. The receiving device may thereby reproduce the residual detected according to the algorithm illustrated in box 94. When used in speech compression applications, the number of vector elements (n) is typically in the range of 40–160 and the number of known vectors (m) is typically on the order of 1024–4096.

Figure 7:
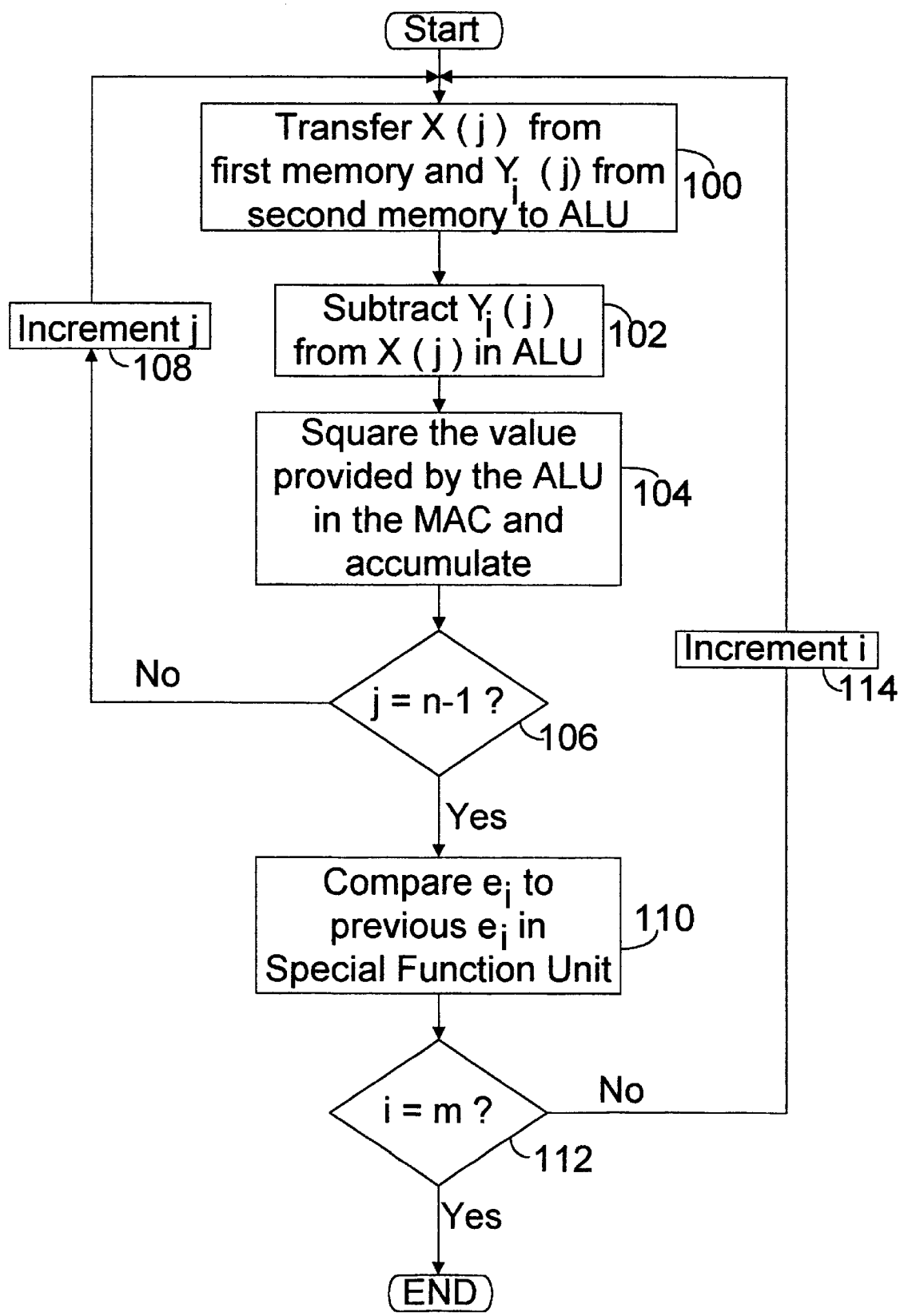
FIG. 7 is a flow chart depicting processor activities when performing the algorithm shown in FIG. 6.

FIG. 7 is a flow chart depicting the operation of DSP 10 ("the DSP") when implementing the algorithm shown in FIG. 6. For the discussion of FIG. 7, reference numbers of elements of DSP 10 will be omitted for brevity. Steps 100, 102, and 104 describe the operation of the DSP for each element of the vectors being operated upon. The input vector is stored in the first data memory within the DSP, while the known vectors are stored in the second data memory. The first data memory may be configured with sufficient storage for storing the input vector, such that each storage location is accessed once during the comparison of the input vector to a particular known vector. Addressing for the first data memory may be employed in a circular memory fashion such that, upon access to the last element in the input vector and subsequent increment of the address, the address reverts to the first element in the input vector. Similarly, the second data memory may include sufficient storage for the known vectors. The known vectors may be arranged in contiguous memory locations within the second memory such that, subsequent to accessing the last element of a particular known vector and incrementing the address, the address identifies a succeeding storage location storing the first element of another known vector.

As shown in step 100, an element of input vector X and the corresponding element of known vector $Y_i$ are transferred from the first and second memories, respectively. The elements are transferred to the ALU. The ALU subtracts the element of $Y_i$ from the corresponding element of X (step 102). The result produced by the ALU is conveyed to the MAC unit. The MAC unit receives the result as both of its input operands, thereby producing a product equal to the square of the ALU result. The MAC unit accumulates the square of the ALU result with the squares of the other differences corresponding to the present known vector (step 104).

Decision box 106 determines whether differencing and squaring the input vector and the current known vector is complete. If the operations of steps 100–104 have been repeated "n" times (i.e. j=n−1), then the vector is complete. If the operations of steps 100–104 have not been repeated "n" times yet, then another iteration of the operations of steps 100–104 is performed. As represented by step 108, the addresses of the first and second data memories are incremented to access the next consecutive storage locations. It is noted that "n" refers to the number of elements included within each vector.

Although shown in FIG. 7 as a series of serial steps, it is noted that the steps may be pipelined such that a second iteration of the steps may begin prior to a first iteration of the steps completing. For example, once the values are transferred from the first and second data memories as depicted in step 100, the addresses indicating memory locations to be transferred next may be incremented (step 108) and the next values may be conveyed to the ALU while the ALU performs step 102. Similarly, the ALU may perform step 102 upon a second pair of vector elements while the MAC unit is performing step 104 upon a first pair of vector elements.

When steps 100–104 have been performed upon each element of the input vector and corresponding elements of one of the known vectors, the MAC unit transmits the accumulated sum to the special functional unit. As depicted by step 110, the special functional unit compares the accumulated sum ($e_i$) to the numerically smallest of the previously generated $e_i$ (from previous iterations of steps 100–104 upon input vector X and known vector $Y_i$). The smaller numerical value between the current accumulated sum and the numerically smallest is saved for further comparison. Additionally, an indication of which known vector $Y_i$ which corresponds to the smallest numerical $e_i$ is stored.

Decision box 112 depicts the determination of whether or not each of the known vectors (shown in box 92 in FIG. 6) have been processed. If each vector has been processed, then the smallest numerical $e_i$ of the known vectors has been computed. Processing may continue with additional groups of known vectors, or the algorithm may be complete. If each of the known vectors within the current group has not been accessed, an internal counter indicative of the current known vector number is incremented (step 114), and the iteration of steps 100–104 begins again. It is noted that steps 110–114 may be pipelined with the beginning of steps 100–108 for the next known vector as well.

It is noted that, between the completion of computation upon a known vector $Y_i$ and the beginning of computation upon a subsequent known vector $Y_{i+1}$, the accumulated result stored by the MAC unit must be zeroed in order to begin accumulating the sum of the squares of the differences between input vector X and known vector $Y_{i+1}$. A control signal may be included between the instruction sequencer and the MAC unit for forcing the accumulated result to zero. Typically, the control signal forces the accumulated result being added into the multiplication result produced by the MAC unit to zero. The instruction sequencer may assert the control signal when the MAC unit is squaring the first difference of the subsequent known vector (i.e. X(0)–$Y_{i+1}$(0)), such that the first squared difference is added to zero and stored into the accumulated result.

Turning now to FIG. 8, a table 120 is shown depicting exemplary encodings of bus configuration field 64 for the embodiment shown in FIG. 5B. Table 120 depicts encodings for instructions performing the algorithm shown in FIG. 6. A pair of encodings are shown, listed in table 120 as Encoding 1 and Encoding 2. Encoding 1 is used by instructions which perform the steps shown in the flow chart of FIG. 7. During these steps, ALU input buses 36A and 36B (AI1 and AI2) are connected to data memory buses 26A and 26B, respectively, for receiving memory operands. MAC unit input buses 36C and 36D (MI1 and MI2) are connected to ALU output bus 38A, and special function unit input bus 36E (SI1) is connected to MAC unit output bus 38B. In this manner, ALU unit 20 may receive elements of vector X and known vector $Y_i$ and provide the difference to both inputs of MAC unit 22. MAC unit 22 thereby squares the difference and accumulates the difference in output register 34B. When steps 100–104 have been completed for a particular known vector $Y_i$, output bus 28B from MAC unit 22 transfers the calculated $e_i$ to special function unit 24. Special function unit 24 may calculate the numerically smaller value between $e_i$ and the previously generated $e_i$, whence the address of the vector $Y_i$ corresponding to the smallest numerical value $e_i$ is stored in output register 34C.

When the flow chart shown in FIG. 7 is completed, the value stored in output register 34C is transferred to first data memory 12. Encoding 2 is used to perform this transfer.

As table 120 illustrates, the interconnection of the functional units of DSP 10 is optimized for the algorithm being performed. During any given clock cycle, an interconnection which is optimal for the algorithm being executed may be formed via an encoding within the instruction. An example which further illustrates advantages of the dynamic reconfiguration of the interconnection between functional units may be the evaluation of a polynomial. A generic polynomial expression of degree "n" is shown in equation 1 below:

$$a_n x^n + a_{n-1} x^{n-1} + a_{n-2} x^{n-2} + \ldots + a_1 x + a_0 \qquad (1)$$

Equation 1 may be expressed in the form of equation 2 below:

$$( \ldots (a_n x + a_{n-1}) x + a_{n-2}) x + \ldots + a_1) x + a_0 \qquad (2)$$

In the form of equation 2, the polynomial may be evaluated as a series of multiplications of x and a previously generated sum and then producing a new sum of the product of the multiplication and one of the polynomial coefficients. For example, x may be multiplied by coefficient $a_n$. The product thus generated may be added to $a_{n-1}$ to produce a sum. The sum may then be multiplied by x, the resulting product added to $a_{n-2}$, etc. Evaluating the polynomial according to the expression shown in FIG. 2 may be efficiently performed by using the dynamic reconfiguration of bus interconnect 28.

Table 130 shown in FIG. 9 depicts encodings which may be used in instructions causing the evaluation of the polynomial shown in equation 2. Encoding 1 is used for an initializing instruction. The initializing instruction causes the value of x to be transferred from first data memory 12 to input register 32C of MAC unit 22 and the value of an to be transferred from second data memory 14 to input register 32D of MAC unit 22. Thereafter, MAC unit 22 retains the value of x in input register 32C. On alternating clock cycles, encoding 2 and encoding 3 are used with instructions. Encoding 2 causes the transfer of $a_i$ from second data memory 14 to input register 32A of ALU 20 and the output of MAC unit 22 to input register 32B of ALU 20. ALU 20 thereby adds $a_i$ and the product formed by MAC unit 22. Encoding 3 causes transfer of the sum formed by ALU 20 to input register 32D of MAC unit 22. MAC unit 22 thereby forms the product of the sum and the value of x (stored in input register 32C). By alternating passing sums to MAC unit 22 and products to ALU 20, the evaluation of the polynomial proceeds in an efficient fashion. The interconnection between the functional units changes from clock cycle to clock cycle to provide the optimum bus configuration for the portion of the evaluation being performed during that clock cycle.

It is noted that, because the connections made by encoding 2 and encoding 3 are independent, encoding 2 and encoding 3 may be combined to produce an encoding which may be used by either instruction in the repetitive multiply and add sequence. However, in cases where an input bus is used in both of a pair of encodings which are alternated and the input bus is connected in a dissimilar fashion in each of the pair of encodings, then the encodings cannot be combined. However, the bus interconnect may be alternated between the encodings producing an efficient interconnect for the algorithm despite the dissimilar use of the input bus. For example, referring to FIG. 8, data memory bus 26A is used to transfer data in a dissimilar fashion between the two encodings. The first encoding causes connection between data memory bus 26A and input bus 36A. Conversely, data memory bus 26A is connected to output bus 36C of special function unit 24 via the second encoding. If the algorithm is repeated, then the first encoding is used again subsequent to the second encoding. The connection of data memory bus 26A is thereby alternated between the two encodings.

It is noted that the present discussion refers to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

It is further noted that, although the above discussion uses a DSP as a specific example employing the apparatus described herein, any processor may benefit from the apparatus. General purpose microprocessors, for example, may benefit from the apparatus. A "processor" is any apparatus configured to perform a set of operations in response to a set of instructions.

In accordance with the above disclosure, a processor having a dynamically alterable interconnect has been described. The interconnect is modified in response to an instruction field. Advantageously, a block of code may specify an efficient interconnection of functional units and storage devices for the performance of a particular algorithm. The interconnection may be modified on a cycle-by-cycle basis, allowing even complex algorithms which use the functional units in different manners to be employed.

Numerous variations and modifications will become apparent to those skilled in the art once the above disclosure is fully appreciated. It is intended that the following claims be interpreted to embrace all such variations and modifications.

What is claimed is:

1. A processor, comprising:
   an instruction sequencer configured to execute instructions having an opcode field and a bus configuration field, wherein said instruction sequencer is configured to produce at least one control signal in response to a first encoding of said bus configuration field; and
   a bus interconnect coupled to receive said control signal from said instruction sequencer, said bus interconnect including a first plurality of buses and a second plurality of buses, wherein said bus interconnect is configured to route data from one of said first plurality of buses to one of said second plurality of buses if said control signal is asserted,
   wherein data from said one of said first plurality of buses is prevented from being routed to said one of said second plurality of buses if said control signal is deasserted.

2. The processor as recited in claim 1 wherein said bus interconnect comprises a crossbar interconnect, and wherein said crossbar interconnect is configured to receive a different control signal for each one of said first plurality of buses and each one of said second plurality of buses, and wherein said different control signal, if asserted, causes routing of data from said one of said first plurality of buses to said one of said second plurality of buses.

3. The processor as recited in claim 1 further comprising a plurality of functional units configured to perform instruction operations according to said instructions executed by said instruction sequencer.

4. The processor as recited in claim 3 wherein one of said plurality of functional units comprises a multiply and accumulate unit configured to multiply a pair of operands and accumulate a resulting product with other products calculated therein.

5. The processor as recited in claim 3 wherein each one of said plurality of functional units is coupled to at least one of said second plurality of buses to receive operands upon which to perform said instruction operations.

6. The processor as recited in claim 5 wherein said one of said plurality of functional units is configured to store said operands in at least one input register coupled to said at least one of said second plurality of buses.

7. The processor as recited in claim 5 wherein said each one of said plurality of functional units is coupled to one of said first plurality of buses to convey a result of performing said instruction operations.

8. The processor as recited in claim 7 wherein said each one of said plurality of functional units is configured to store said result in an output register prior to conveying said result upon said one of said first plurality of buses.

9. The processor as recited in claim 3 further comprising a register file coupled to said bus interconnect, wherein said register file is configured to store a plurality of data values for use by said plurality of functional units.

10. The processor as recited in claim 9 wherein said register file is coupled to a third bus, and wherein said register file is configured to provide and receive said plurality of data values upon said third bus.

11. The processor as recited in claim 10 wherein said bus interconnect is configured to convey data from one of said first plurality of buses to said third bus upon assertion of a second control signal from said instruction sequencer, said instruction sequencer being configured to assert said second control signal in response to a second encoding of said bus configuration field.

12. The processor as recited in claim 9 further comprising a first data memory and a second data memory, wherein said first data memory and said second data memory are coupled to said bus interconnect, and wherein said first and second data memories are configured to store a second plurality of data values and a third plurality of data values, respectively.

13. The processor as recited in claim 12 wherein said first data memory is configured to provide and receive said second plurality of data values upon a fourth bus, and wherein said second data memory is configured to provide and receive said third plurality of data values upon a fifth bus.

14. The processor as recited in claim 13 wherein said bus interconnect is configured to route data from one of said first plurality of buses to said fourth bus upon assertion of a third control signal from said instruction sequencer, and wherein said bus interconnect is configured to route data from one of said first plurality of buses to said fifth bus upon assertion of a fourth control signal from said instruction sequencer, and wherein said instruction sequencer is configured to assert said third control signal in response to a third encoding of said bus configuration field, and wherein said instruction sequencer is configured to assert said fourth control signal in response to a fourth encoding of said bus configuration field.

15. A method for efficient data routing in a processor, comprising:

encoding a connection between a first output of a first functional unit and a first input of a second functional unit within a first field of an instruction;

detecting said first field upon execution of said instruction;

asserting at least one control signal upon detection of said first field;

routing data from said first output to said first input in a bus interconnect upon assertion of said at least one control signal, and preventing routing of data from said first output to said first input upon deassertion of said at least one control signal.

16. The method as recited in claim 15 wherein said bus interconnect comprises a crossbar interconnect connecting a plurality of outputs of a plurality of functional units to a plurality of inputs from said plurality of functional units.

17. The method as recited in claim 15 further comprising routing data from said first output to a register file upon assertion of a second control signal.

18. The method as recited in claim 15 further comprising routing data from said first output to a first and second data memories upon assertion of a third and fourth control signal, respectively.

* * * * *